United States Patent
Small et al.

(10) Patent No.: US 10,194,002 B2
(45) Date of Patent: Jan. 29, 2019

(54) VBN SERVER CLUSTERING SYSTEM, METHOD OF VBN SERVER CLUSTERING, AND VBN SERVER FOR CLUSTERING

(71) Applicant: SolutionInc Limited, Halifax (CA)

(72) Inventors: Keith Macpherson Small, Halifax (CA); Charles Arthur Taylor Feild, Halifax (CA); James Randolph Currie, Halifax (CA)

(73) Assignee: SolutionInc Limited, Halifax, NS (CA)

( * ) Notice: Subject to any disclaimer, the term of this patent is extended or adjusted under 35 U.S.C. 154(b) by 213 days.

(21) Appl. No.: 15/039,835

(22) PCT Filed: Nov. 27, 2014

(86) PCT No.: PCT/CA2014/051138
§ 371 (c)(1),
(2) Date: May 26, 2016

(87) PCT Pub. No.: WO2015/077889
PCT Pub. Date: Jun. 4, 2015

(65) Prior Publication Data
US 2016/0381184 A1    Dec. 29, 2016

(30) Foreign Application Priority Data
Nov. 28, 2013 (CA) ..................... 2834565

(51) Int. Cl.
*H04L 29/06*    (2006.01)
*G06F 17/30*    (2006.01)
(Continued)

(52) U.S. Cl.
CPC ........ *H04L 67/42* (2013.01); *G06F 17/30345* (2013.01); *G06F 17/30575* (2013.01);
(Continued)

(58) Field of Classification Search
CPC .............. H04L 61/103; H04L 61/2015; H04L 61/2061; H04L 61/6022; H04L 67/42;
(Continued)

(56) References Cited

U.S. PATENT DOCUMENTS 5,958,010 A * 9/1999 Agarwal ................. H04L 43/12
709/223
6,353,891 B1 * 3/2002 Borella ................... G06F 21/33
726/1
(Continued)

FOREIGN PATENT DOCUMENTS

CA    2672642 A1 *  1/2011  ....... H04L 29/12283
WO    WO2009094764 A1    8/2009

OTHER PUBLICATIONS

PCT International Search Report dated Feb. 12, 2015 in related PCT Application No. PCT/CA2014/051138.

*Primary Examiner* — Kostas J Katsikis
(74) *Attorney, Agent, or Firm* — Robert D. Buyan; Stout, Uxa & Buyan, LLP

(57) ABSTRACT

A visitor based network (VBN) server clustering system comprises a cluster of VBN servers for servicing a single local area network (LAN). Each VBN server comprises a client device data store for creating and maintaining device state records of user devices connected to the LAN, an interface for data communication with the user devices through the LAN, and a network traffic processing unit for processing network traffic from and to the user devices using the device state records in the client device data store. The VBN server further comprises a clustering manager for implementing clustering of the VBN servers by filtering the network traffic from and to the one or more user devices based on the configuration settings of the VBN servers and the device state records so as to allow the network traffic processing unit to process only a filtered portion of the
(Continued)

network traffic. The filtering of the network traffic partitions the network traffic so that each user device is processed by a single one of the VBN servers within the cluster at a given time.

63 Claims, 5 Drawing Sheets

(51) Int. Cl.
*H04L 12/26* (2006.01)
*H04L 12/24* (2006.01)
*H04L 29/08* (2006.01)
*H04L 12/16* (2006.01)
*H04L 29/12* (2006.01)

(52) U.S. Cl.
CPC ............ *H04L 12/16* (2013.01); *H04L 41/082* (2013.01); *H04L 41/085* (2013.01); *H04L 41/0816* (2013.01); *H04L 41/0893* (2013.01); *H04L 43/028* (2013.01); *H04L 61/2015* (2013.01); *H04L 67/1002* (2013.01); *H04L 41/0654* (2013.01); *H04L 43/0817* (2013.01); *H04L 61/103* (2013.01); *H04L 61/2061* (2013.01); *H04L 61/6022* (2013.01)

(58) Field of Classification Search
CPC . H04L 67/1002; H04L 41/082; H04L 41/085; H04L 41/0654; H04L 41/0816; H04L 41/0893; H04L 43/028; H04L 43/0817; H04L 12/16; G06F 17/30345; G06F 17/30575
See application file for complete search history.

(56) References Cited

U.S. PATENT DOCUMENTS

| | | | | |
|---|---|---|---|---|
| 6,564,261 B1* | 5/2003 | Gudjonsson | ........ | H04L 12/1818 370/261 |
| 6,714,976 B1* | 3/2004 | Wilson | .................. | H04L 29/06 709/224 |
| 7,356,841 B2* | 4/2008 | Wilson | ................ | H04L 12/2856 370/389 |
| 7,536,552 B2* | 5/2009 | Touitou | .................. | H04L 63/08 713/150 |
| 8,054,804 B2* | 11/2011 | Small | .................... | H04L 12/462 370/331 |
| 8,495,711 B2* | 7/2013 | Small | ................ | H04L 29/12283 713/155 |
| 9,350,706 B1* | 5/2016 | Smith | ................. | H04L 63/0245 |
| 2002/0009078 A1* | 1/2002 | Wilson | ................ | H04L 12/2856 370/389 |
| 2002/0078174 A1* | 6/2002 | Sim | ................... | G06F 17/30194 709/219 |
| 2003/0118038 A1* | 6/2003 | Jalava | ................. | H04L 63/0263 370/401 |
| 2003/0172145 A1* | 9/2003 | Nguyen | ................ | G06Q 10/10 709/223 |
| 2004/0078312 A1* | 4/2004 | Bush | ..................... | G06Q 30/02 705/35 |
| 2006/0031436 A1* | 2/2006 | Sakata | .................... | H04L 12/14 709/221 |
| 2006/0067216 A1* | 3/2006 | Lalonde | ................ | H04L 41/142 370/230 |
| 2006/0080657 A1* | 4/2006 | Goodman | ............ | G06F 9/5061 717/177 |
| 2008/0091466 A1* | 4/2008 | Butler | .................... | G06Q 10/06 705/2 |
| 2008/0148342 A1* | 6/2008 | Aiyagari | ............... | H04L 12/462 726/1 |
| 2008/0148383 A1* | 6/2008 | Pitchaikani | ............ | H04L 67/20 726/12 |
| 2008/0183991 A1* | 7/2008 | Cosmadopoulos | ........................ | G06F 11/2097 711/162 |
| 2009/0193103 A1* | 7/2009 | Small | .................... | H04L 12/462 709/221 |
| 2009/0319248 A1* | 12/2009 | White | ................ | G09B 19/0053 703/13 |
| 2011/0016223 A1* | 1/2011 | Iannaccone | ............. | H04L 45/00 709/232 |
| 2011/0023093 A1* | 1/2011 | Small | ................ | H04L 29/12283 726/4 |
| 2013/0013351 A1* | 1/2013 | Cholak | .................. | G06Q 10/08 705/5 |
| 2014/0245423 A1* | 8/2014 | Lee | .................... | H04L 63/0218 726/12 |
| 2015/0095692 A1* | 4/2015 | Thiele | ................ | G06F 9/45533 714/6.11 |

* cited by examiner

VBN SERVER CLUSTERING SYSTEM, METHOD OF VBN SERVER CLUSTERING, AND VBN SERVER FOR CLUSTERING

RELATED APPLICATIONS

This application is a 35 U.S.C. § 371 national stage of PCT International Patent Application No. PCT/CA2014/051138 filed Nov. 27, 2014, which claims priority to Canadian Patent Application No. 2,834,565 filed Nov. 28, 2013 which has issued as Canadian Patent No. 2,834,565 on Jan. 19, 2016, the entire disclosure of each such prior application and patent being expressly incorporated herein by reference.

FIELD OF THE INVENTION

The present invention relates to a visitor based network (VBN) server clustering system, a method of VBN server clustering, and a VBN server for clustering.

BACKGROUND OF THE INVENTION

There are many mobile users who want to have temporary access to the Internet using their computer devices at various locations. In order to provide network services to those user devices, visitor based networks (VBNs) are provided in various locations, such as hotels, airports and convention centers. Often users are required to register with VBN servers to use those visitor based networks.

Visitor based network (VBN) servers are being required to service increasingly 'large' local area networks (LANs), where the 'size' of the LAN is defined by the number of concurrently connected user devices, and/or the number of concurrent user registration events, and/or the volume of network traffic.

Servicing a LAN by a VBN server involves provisioning end-user devices and network infrastructure devices, performing authorization and possibly authentication tasks for the end-users, creating and maintaining status records representing end-user devices and network infrastructure devices, processing network traffic which flows through the LAN, from the LAN to the wide area network (WAN), and from the WAN to the LAN, and optionally billing for network access by the end-user devices. An example of such a VBN server is a SolutionIP™ VBN server from Solution-Inc Limited. The Solution IP™ VBN server has a registration driver that manages registration of user devices. Registration data of a registered user device includes its authorization state, assigned IP address, and user device's Media Access Control (MAC) address. The registration driver has a set of assignable internet protocol (IP) address ranges for multiple routing realms, and assigns an IP address to a user device from such a relevant IP address range depending on a routing realm from which communication from the user device is received. The assignable IP address ranges include an authorization address range from which the registration driver assigns an IP address to a user device whose authorization request is received from an authorization assisting device. When an authorization assisting device sends to the VBN server an authorization request for access to the WAN by a requesting user device, an authorization module of the server processes the authorization request to generate an authorization response granting or denying the access to the WAN by the requesting user device based on the registration data in the registration data store and the information in the authorization request.

A VBN server, as with any computer system, can be modified and optimized in its software and/or hardware in order to perform a 'larger' task than would otherwise be possible. However, the efficacy of such scaling improvements is ultimately limited, because a single hardware/software system can never be optimized to an infinite degree. The Law of Diminishing Returns rapidly becomes a factor in such optimization efforts.

It is therefore desirable to approach the very large visitor-based network problem from a different direction: by applying more than one VBN server to a large network. Efforts to endlessly optimize the VBN server's hardware/software system would be unnecessary in this scheme, because scaling would be achieved by simply adding additional hardware/software systems. The potential degree of such scaling is obviously orders of magnitude greater than the degree of scaling that could ever be achieved by observing the traditional limitations of a single VBN server per network.

In the past, such multi-VBN-server scaling has been performed by effectively segmenting the LAN into one or more distinct LANs, by rearranging the LAN's physical or logical network topology, and then applying a VBN server to each new segmented portion of the original LAN. Each VBN server thus services a LAN which has been 'shrunk' in order to meet the VBN server's capabilities.

However, the alteration of a public access LAN's physical or logical topology is almost always undesirable, and often simply unacceptable, to the owner/operator of the LAN, and is occasionally unfeasible due to the composition of the LAN.

On the other hand, when multiple computers are used, it is known to provide a network load balancer. However, there is no known technique that performs load balancing with VBN servers. A network load balancer used in a conventional computer network is a software agent which resides between the originator of a service request, i.e., an end-user device, and a collection of network servers each of which is capable of responding to that request. The load balancing agent decides to which of the servers the request should be sent, based upon various factors such as the current business of each of the servers, and then forwards the request to the selected server. The load balancing agent thus acts as an intermediary between the originator of the request and the servers.

Also, numerous techniques exist for implementing a form of network load sharing with network infrastructure devices, such as switches, by implementing various forms of Link aggregation. Link aggregation is a broad term which refers to assorted means of traffic flow control, including the direction of specific types of network traffic into particular network connections, such as switch ports. There are standards-based techniques, such as 802.3ad, and assorted semi-proprietary methods implemented by major hardware vendors. These techniques often require a special control protocol, such as link aggregation control protocol (LACP). The use of such control protocols makes the use of these methods of Link aggregation with VBN servers difficult, or at least impractical.

Also, numerous types and applications of computer clustering exist. However, a common limitation of computer clustering is the need for software running on each member of the cluster to be able to interact with other members of the cluster, for the purposes of responsibility delegation, cooperation, and fault tolerance. Since the possible responsibilities of an arbitrary computer system are effectively infinite, there is no boilerplate clustering solution which can be applied to satisfy all of the requirements of all computer systems. Therefore, there is no clustering solution available which can be applied to VBN servers in order to satisfy the peculiar requirements of VBN servers which perform specialized processing upon network traffic, and maintain their own types of data in their own unique ways.

Therefore, it is desirable to provide a mechanism that allows use of multiple VBN servers that can service a LAN, without requiring modifications to the LAN.

SUMMARY OF THE INVENTION

It is an object of the invention to provide an improved VBN server system that obviates or mitigates at least one of the disadvantages of existing systems.

The invention uses a cluster of VBN servers to service a single LAN.

In accordance with an aspect of the present invention, there is provided a visitor based network (VBN) server clustering system comprising a cluster of VBN servers that are configured to cooperate to service a single local area network (LAN).

Each of the VBN servers comprises a client device data store that is configured to create and maintain device state records of one or more user devices connected to the LAN; an interface that is configured to perform data communication with the one or more user devices through the LAN; a network traffic processing unit that is configured to process network traffic from and to the one or more user devices using the device state records in the client device data store; and a clustering manager that is configured to implement clustering of the VBN servers by filtering the network traffic from and to the one or more user devices based on filtering criteria using the configuration settings of the VBN server so as to allow the network traffic processing unit to process only a filtered portion of the network traffic. The filtering of the network traffic by the clustering manager of each of the VBN servers partitions the network traffic so that each user device is processed by a single one of the VBN servers within the cluster at a given time.

In accordance with another aspect of the present invention, there is provided a visitor based network (VBN) server which is used as a member of a cluster of VBN servers that cooperate to service a single local area network (LAN). The VBN server comprises a client device data store that is configured to create and maintain device state records of one or more user devices connected to the LAN; an interface that is configured to perform data communication with the one or more user devices through the LAN; a network traffic processing unit that is configured to process network traffic from and to the one or more user devices using the device state records in the client device data store; and a clustering manager that is configured to implement clustering of the VBN servers by filtering the network traffic from and to the one or more user devices based on filtering criteria using the configuration settings of the VBN server so as to allow the network traffic processing unit to process only a filtered portion of the network traffic. The filtering of the network traffic by the clustering manager partitions the network traffic so that each user device is processed by a single one of the VBN servers within the cluster at a given time.

In accordance with another aspect of the present invention, there is provided a method of clustering multiple visitor based network (VBN) servers to cooperate to service a single local area network (LAN). The method comprises in each VBN server, creating and maintaining device state records of one or more user devices connected to the LAN in a client device data store; in each VBN server, filtering network traffic from and to the one or more user devices based on filtering criteria using configuration settings of the VBN server; and in each VBN server, processing only a filtered portion of the network traffic using the device state records in the client device data store. The filtering of the network traffic partitions the network traffic so that each user device is processed by a single one of the VBN servers within the cluster at a given time.

In accordance with another aspect of the present invention, there is provided a computer readable medium storing computer readable code for execution in a computer, the code having instructions for implementing a method of clustering multiple visitor based network (VBN) servers to cooperate to service a single local area network (LAN). The instructions comprise the steps of in each VBN server, creating and maintaining device state records of one or more user devices connected to the LAN in a client device data store; in each VBN server, filtering network traffic from and to the one or more user devices based on filtering criteria using configuration settings of the VBN server; and in each VBN server, processing only a filtered portion of the network traffic using the device state records in the client device data store. The filtering of the network traffic partitions the network traffic so that each user device is processed by a single one of the VBN servers within the cluster at a given time.

In accordance with another aspect of the present invention, there is provided a visitor based network (VBN) server clustering system comprising a cluster of VBN servers and a network divider. The VBN servers are configured to cooperate to service a single local area network (LAN). Each of the VBN servers comprises a client device data store that is configured to create and maintain device state records of one or more user devices connected to the LAN; an interface that is configured to perform data communication with the one or more user devices through the LAN; and a network traffic processing unit that is configured to process network traffic from and to the one or more user devices using the device state records in the client device data store. The network divider is configured to communicate with the VBN servers within the cluster, and implement clustering of the VBN servers by partitioning the network traffic from and to the one or more user devices to a particular one of the VBN servers based on partitioning criteria which considers the configuration settings of the VBN servers so as to allow the network traffic processing unit to process only a partitioned portion of the network traffic, so that each user device is processed by a single one of the VBN servers within the cluster at a given time.

In accordance with another aspect of the present invention, there is provided a method of clustering multiple visitor based network (VBN) servers to cooperate to service a single local area network (LAN). The method comprises in each VBN server, creating and maintaining device state records of one or more user devices connected to the LAN in a client device data store; in a network divider that communicates with each VBN server, partitioning network traffic from and to the one or more user devices based on partitioning criteria using configuration settings of each VBN server, so that each user device is processed by a single one of the VBN servers within the cluster at a given time; and in each VBN server, processing only a partitioned portion of the network traffic using the device state records in the client device data store.

In accordance with another aspect of the present invention, there is provided a computer readable medium storing computer readable code for execution in a computer, the code having instructions for implementing a method of clustering multiple visitor based network (VBN) servers to cooperate to service a single local area network (LAN). The instructions comprise the steps of in each VBN server, creating and maintaining device state records of one or more user devices connected to the LAN in a client device data store; in a network divider that communicates with each VBN server, partitioning network traffic from and to the one or more user devices based on partitioning criteria using configuration settings of each VBN server, so that each user device is processed by a single one of the VBN servers within the cluster at a given time; and in each VBN server, processing only a partitioned portion of the network traffic using the device state records in the client device data store.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

First Embodiment

Figure 1:
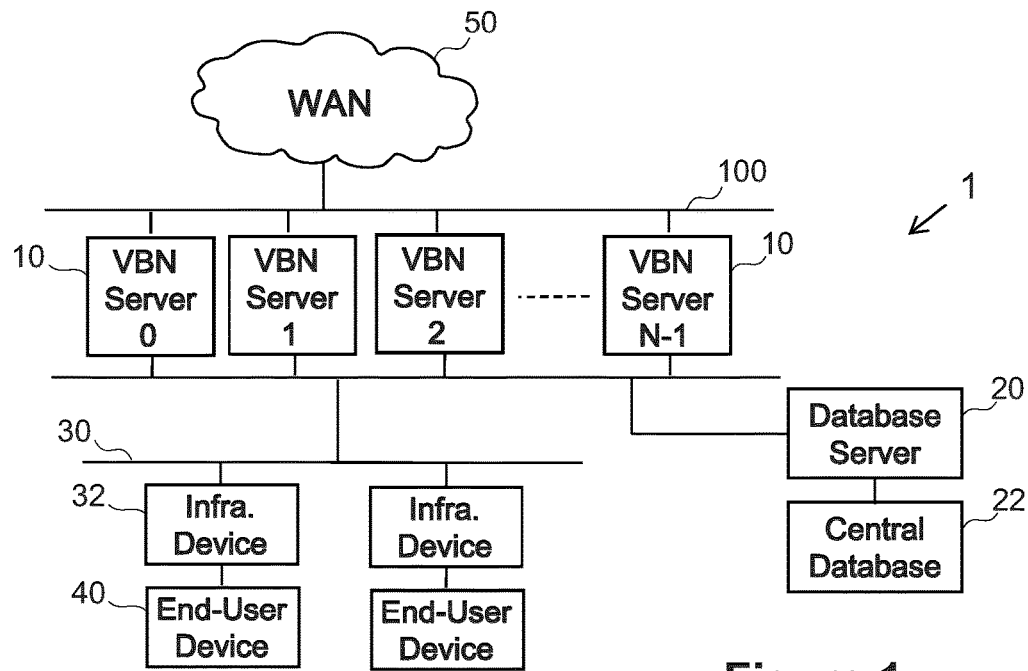
FIG. 1 is a diagram showing a VBN server clustering system in accordance with an embodiment of the present invention.

FIG. 1 schematically illustrates a VBN server clustering system 1 according to an embodiment of the present invention. The VBN server clustering system 1 comprises a cluster 100 of multiple VBN servers 10 and a database server 20. The VBN servers 10 of the cluster 100 cooperate to service a single LAN 30, and process network traffic which flows from end-user devices 40 connected to the LAN 30 to WAN 50, such as the Internet, and from the WAN 50 to end-user devices 40 connected to the LAN 30. End-user devices 40 may be any wired or wireless data communication devices, such as laptop computers, desktop computers, tablet computers, and smartphones. The LAN 30 comprises one or more network infrastructure devices 32, such as common switches, routers, and access points.

Figure 2:
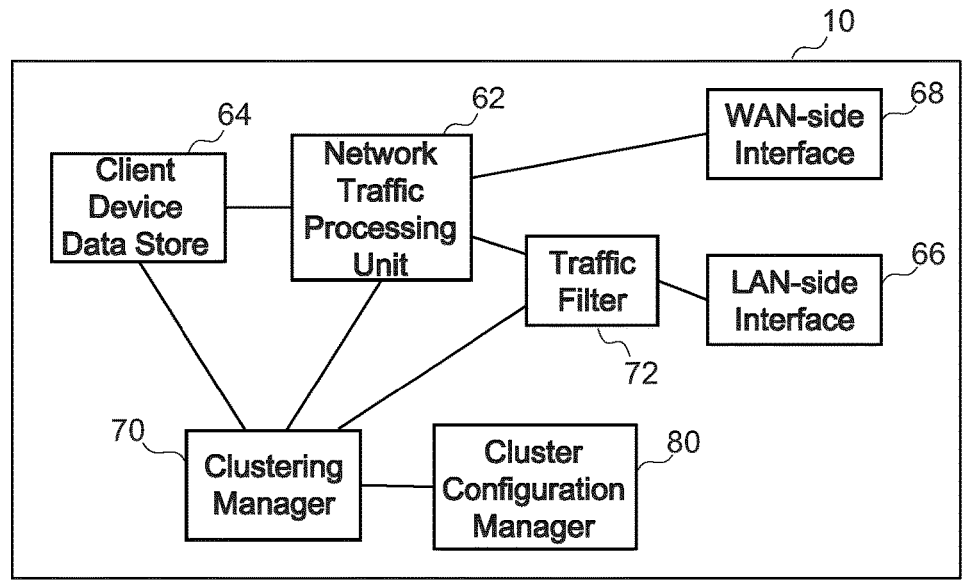
FIG. 2 is a block diagram showing an example of a VBN server.

FIG. 2 shows an example of a VBN server 10. In this example, the VBN server 10 has an interface 60 for data communication with other devices, a network traffic processing unit 62 that processes network traffic, a client device data store 64 for creating and maintaining records of end-user devices and also network infrastructure devices, a clustering manager 70 for implementing functionalities for clustering of the VBN servers, and a cluster configuration manager 80 for managing and sharing the VBN server configuration settings.

A VBN server 10 operates by processing network traffic from end-user devices 40 which are connected to the LAN 30 by the network traffic processing unit 62, and by maintaining device state records which represent the state of those end-user devices by the client device data store 64. Such state information may include data such as, but not limited to, authorization status, network usage measurements, network usage qualifiers such as bandwidth limitations, billing information, and network usage history.

In conventional VBN servers, client device data is stored in a data store or a database using a strategy specific to a VBN server. For example, in a SolutionIP™ VBN server, client device data is stored in Registration Driver. A record in the Registration Driver contains a subset of recorded data of a device, such as an MAC address, IP address, authorization state, usage counters, and assorted attributes. The content of a record of the Registration Driver is created, used by, and updated by the kernel as it processes the network traffic of a device. A SolutionIP™ VBN server uses a billing database. A record in the billing database contains a slightly overlapping set of recorded data of a device, such as MAC and IP addresses and authorization state, but also contains additional information which is not required by the traffic processor of the kernel, such as location on the network, payment details, authentication credentials.

The clustering system 1 propagates records in the client device data store 64 of each VBN server 10 within the cluster 100, using a technique described below. The client device data store 64 may be maintained within kernel memory, and may be backed up to local data files for persistence across server reboots.

The cluster 100 of multiple VBN servers divides the work of servicing the LAN 30 among the VBN servers 10 without modification to the LAN 30. The clustering manager 70 enables the VBN servers themselves to divide the work of servicing the LAN among themselves, without interfering with the operation or the integrity of the LAN. Each VBN server handles a portion of the LAN by its network traffic processing unit 62. Each VBN server defines a specific portion of the LAN according to some criteria, and services only that portion of the LAN. Collectively, all of the deployed VBN servers service the entirety of the LAN, but individually each VBN server services only such a well-defined portion of the LAN.

Figure 3:
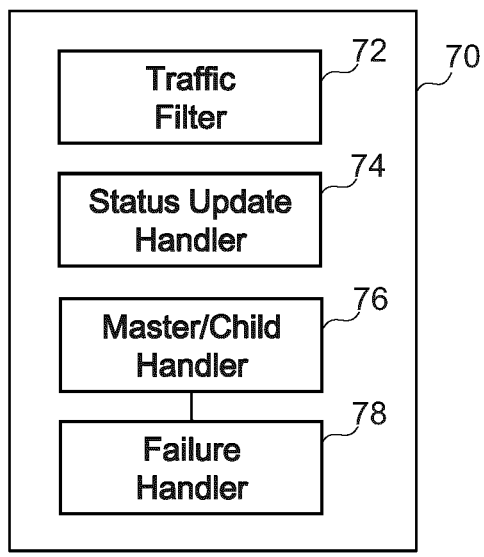
FIG. 3 is a block diagram showing an example of a clustering manager of the VBN server.

FIG. 3 shows an example of the clustering manager 70. In this example, the clustering manager 70 has a traffic filter 72, a status update handler 74, a master/child handler 76, and a failover handler 78.

To divide the work among the multiple VBN servers 10, the traffic filter 72 of the clustering manager 70 of each VBN server 10 filters network traffic according to specific criteria. Each VBN server 10 therefore 'sees', or processes, only a well-defined subset of the LAN's traffic, subject to certain exceptions which will be described later. Since a VBN server 10 operates by servicing distinct end-user devices 40 and network infrastructure devices 32, in this embodiment, the LAN traffic subsets are defined by an attribute or attributes which are associated with a device, such as device identity. Thus, a given device's traffic is processed by only a single particular member of the VBN server cluster 100, not by a continuously varying member of the VBN server cluster 100, at least until some characteristic of that device's presence on the LAN changes, or until the device's VBN server becomes inoperative. That is, the filtering effectively partitions most LAN traffic so that each user device is processed by only a single consistent member of the cluster at any given time. Thus, the VBN server clustering system 1 does not require any modifications to the LAN itself.

The status update handler 74 handles updating of the device state records in the client device data store 64. The device state records in the client device data stores 64 of each VBN server are shared among all active VBN servers 10 in the cluster 100. When the shared device state records are received, the status update handler 74 of each VBN server updates the records in the client device data store 64 based on the shared device state records, as further described below. Thus, the VBN server clustering system 1 implements the replication of user device states among cluster members. Further, when there is a shared central database containing additional client data, such as a billing database, in cooperation with the benefit of such a shared central database; this database may alternatively be present on each VBN server and perform data replication among those database instances.

The master/child handler 76 handles master/child mode changes and master/child functionalities, as further described below.

The failover handler 78 is used to handle failure of one of the VBN servers 10. The failover handler 78 can detect a failure of a VBN server 10, and change settings of the traffic filter 72. In the event of the failure of one of the VBN servers 10, the communication of data among the multiple VBN servers enables one or more of the active VBN servers to assume the duties of the failed VBN server, by utilizing the device state records which had been shared from the failed VBN server, and also the shared/common database records, and by accepting the network traffic which had previously been accepted by the failed VBN server.

Thus, the cluster 100 of VBN servers 10 servicing the LAN can automatically adjust to the sudden failure of one or more members of the VBN server cluster 100, so that service to the LAN is not interrupted. As such, the presence of multiple VBN servers to serve a single unaltered LAN can provide advanced VBN server failover and redundancy mechanisms.

In order for such fault tolerance to be possible, the VBN servers 10 frequently and regularly shares data, such as end-user records, between themselves, and also automatically alters their traffic filtering criteria so that the portion of traffic which had been accepted and processed by the failed VBN server(s) can be accepted and processed by one or more of the remaining members of the VBN server cluster. Some or all such adjustments may be reversed in the event of the recovery of one or more of the failed VBN servers.

The introduction of a cluster of multiple VBN servers to a single network increases the complexity of VBN server configuration and administration. In order to attend to this increased complexity, the VBN server clustering system 1 enables the entire cluster 100 of VBN servers 10 to be configured and administered from any one of those VBN servers, and uses cluster coordination software that propagates configuration changes among the entire cluster 100 of VBN servers 10, as further described below.

Traditional VBN server failover and redundancy models utilize a single standby server, which receives intermittent or continuous state updates from the primary server. The standby server takes over the primary server's responsibilities if the primary server becomes uncommunicative. However, in these schemes, the standby server does not function concurrently with the primary server. At any given moment, only one of the pair of VBN servers is servicing the LAN. In contrast, the VBN server clustering system 1 as exemplified in FIG. 1 has the benefit of fully utilizing each VBN server.

The members of the cluster 100, i.e., the VBN servers 10 within the cluster 100, communicate with one another in order to share data, such as server configuration settings, administrative events, and end-user device states, as well as to detect nonfunctional members of the cluster. When a nonfunctional cluster member has been detected, the cluster 100 automatically delegates the unresponsive member's traffic processing duties to one or more functional members of the cluster. If an unresponsive cluster member is revived, then the cluster 100 automatically re-assigns duties to that revived cluster member.

As shown in FIG. 1, in this embodiment, the VBN server cluster 100 shares a central database 22, which is hosted on a dedicated server 20. The database server 20 is not a member of the cluster 100, and as such, it does not route LAN traffic or otherwise service LAN clients, nor does it participate in the cluster's failover activities. The database server 20 may be a VBN server, but one which has been specially configured to dedicate to offer remote database services. The VBN server clustering system 1 may support a redundant backup central database server in addition to the database server 20.

The cluster configuration manager 80 of each VBN server 10 manages and shares the configuration settings of the VBN server with the other VBN servers within the cluster 100, and the central database 22 when it is provided.

Figure 8:
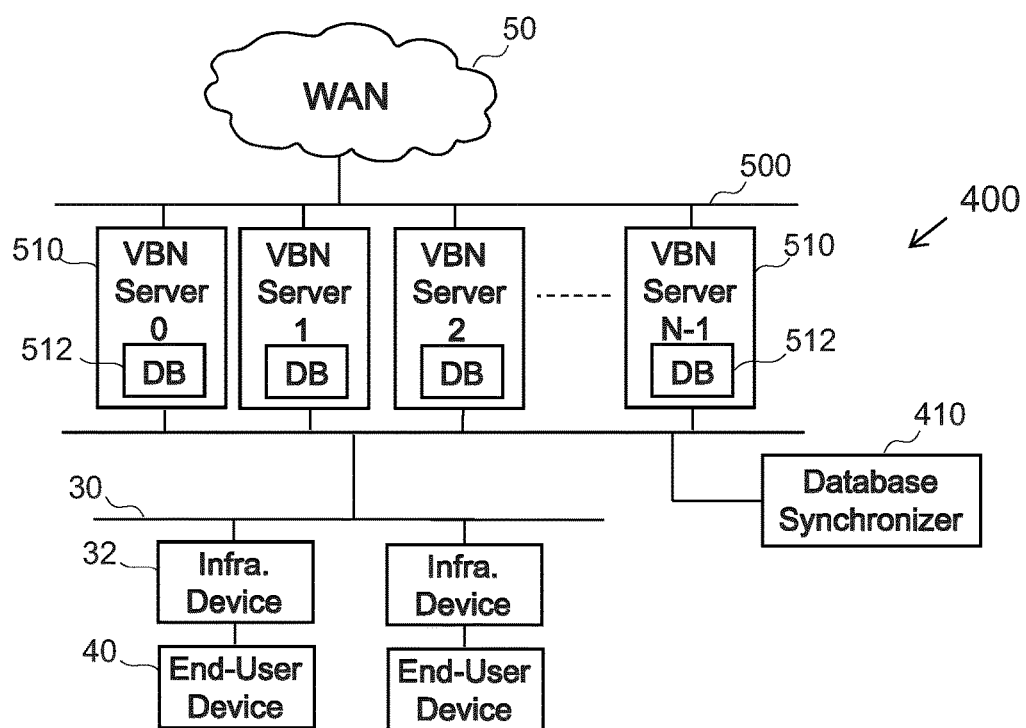
FIG. 8 is a diagram showing a VBN server clustering system in accordance with another embodiment of the present invention.

The VBN servers 10 within the cluster 100 shares the configuration settings among themselves, and thus, it is not necessary to provide a shared central database 22 in the VBN server clustering system. However, when it is provided, the use of the shared central database 22 among the cluster members 10 solves numerous synchronization and propagation problems which would otherwise require a great deal of custom server software to manage, and which would require a good deal of computer processing power to implement. Thus, in this embodiment, a single shared central database is used with a cluster, as exemplified in FIG. 1. The use of a central database obviates the need to perform intermittent database merging. However, in a different embodiment, it is possible to rely upon multiple replicated databases, e.g., a distinct database within each clustered VBN server. FIG. 8 shows an example of such a VBN server clustering system 400 in which each VBN server 510 within the cluster 500 has a database 512. In such a distributed database model, the VBN server clustering system 400 further includes a database synchronizer 410 to communicate the content of those databases among the members of the cluster to perform updates and synchronization so that the multiple databases can collectively act as a central database so as to support failover and redundancy among the cluster members. Further, in a different embodiment, replicated device record stores may be used, in place of such multiple replicated databases.

In the embodiment exemplified in FIG. 1, since the central database 22 contains a large portion of configuration of each VBN server 10, the use of a single central database 22 permits that each member server 10 of the cluster 100 shares many common configuration settings. This is both simple and preferable for VBN server clustering purposes. The central database 22 may be a shared billing database storing client billing information and the VBN server configuration settings. When multiple VBN servers have an existing shared billing database, the cluster coordination software manages and shares the VBN server configuration settings, such as LAN IP Address settings, which are not stored within the billing database.

The member servers 10 of the cluster 100 are organized into one master member, and at least one child member. The child servers communicate only with the master server, in order to minimize the number of communication paths within the cluster. The master server communicates with all of the child servers. Any cluster server 10 is capable of assuming mastery, so that if the current master server is rendered unresponsive, the cluster 100 can continue operating. Thus, each cluster server 10 can function in a master mode or a child mode. The master/child handler 76 of the clustering manager 70 of each VBN server 10 controls the VBN server to act as a master server or a child server. When the VBN server acts as a master server, the master/child handler 76 performs the mastery functionalities, including merger of device state records in the client device data stores of the child servers, and detection and handling of failure of child servers. When the VBN server acts as a child server, the master/child handler 76 performs the child functionalities, including sending status updates to the master server.

Figure 4:
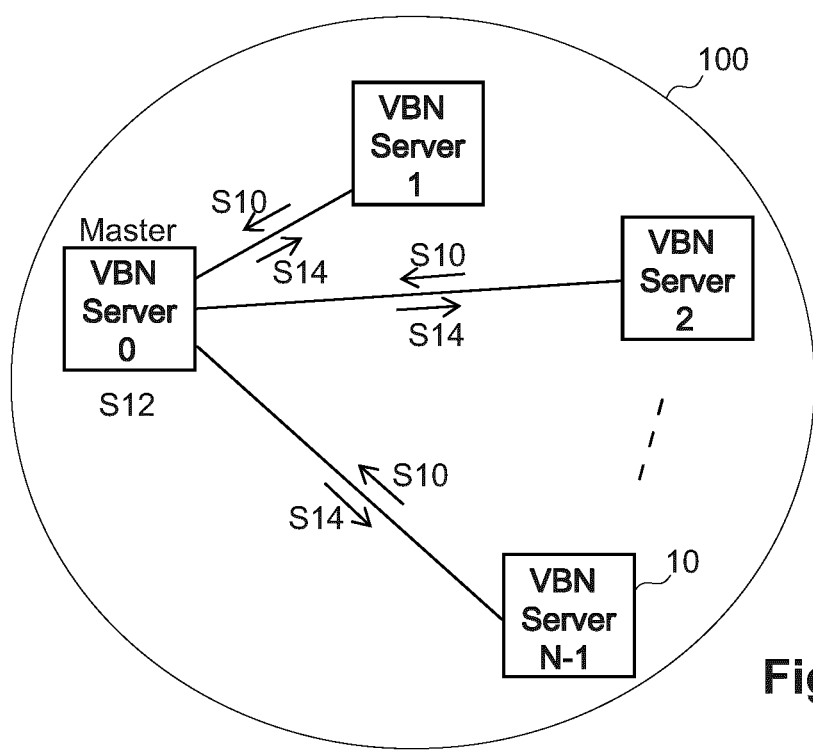
FIG. 4 is a diagram showing an example of communication between a master member and child members within the cluster.
Figure 5:
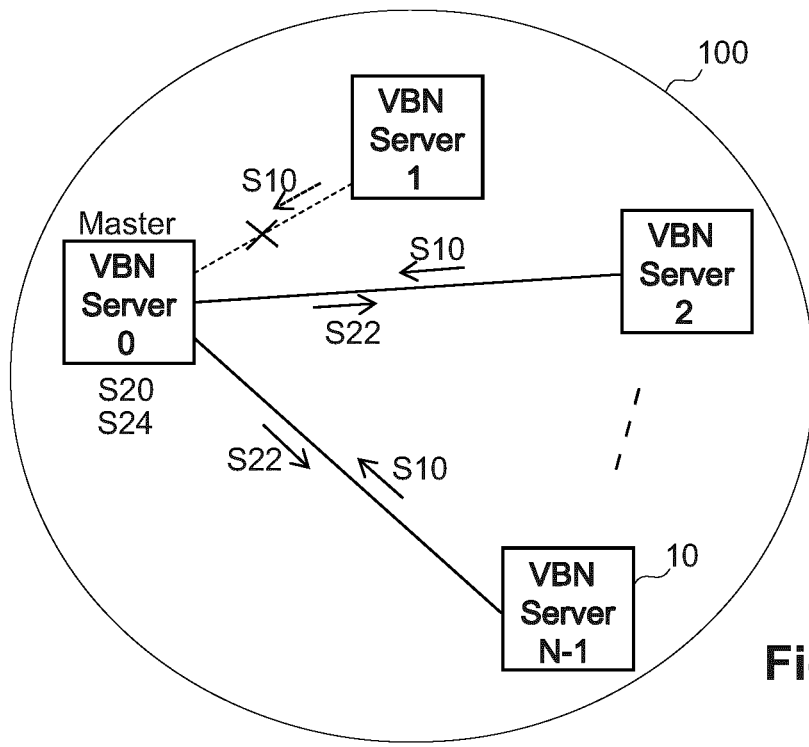
FIG. 5 is a diagram showing another example of communication between a master member and child members within the cluster.
Figure 6:
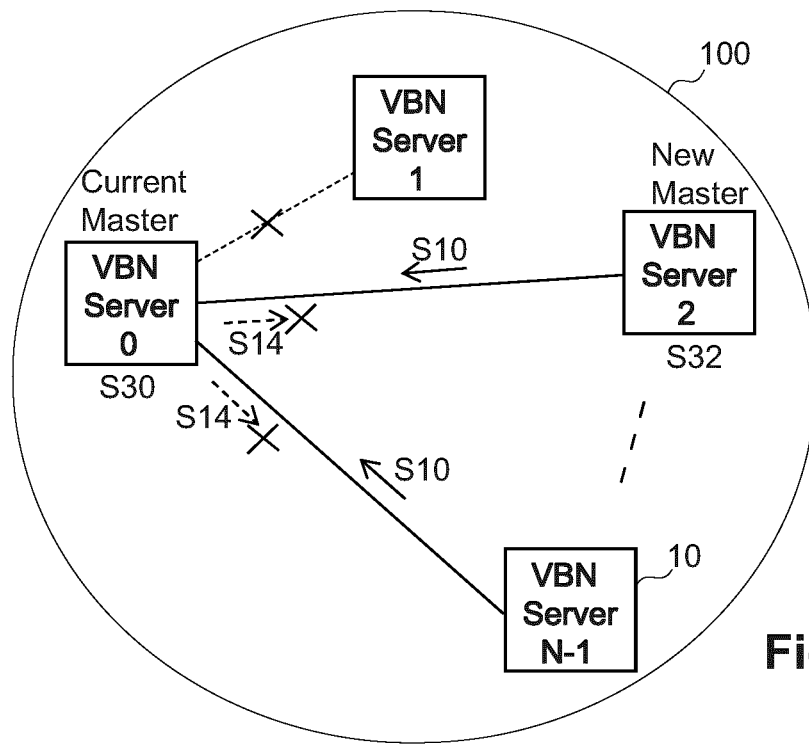
FIG. 6 is a diagram showing another example of communication between a master member and child members within the cluster.

FIGS. 4 to 6 schematically illustrate examples of the communication between a master member, VBN server 0, and child members, VBN servers 1, 2, . . . N−1, within the cluster 100.

A child server intermittently sends the master server status updates, which contain the child server's current client device data store state including the device state records maintained therein (S10). The master server merges each child server's collection of device state records in the client device data store entries into a single comprehensive client device data store state (S12), and then transmits that merged client device data store state to each child server (S14). Thus, each member server 10 of the cluster 100 possesses a reasonably current client device data store state which reflects the state of the entire LAN. Also, when a central database is provided, each VBN server 10 updates and reads from the central database independently and on demand. When each cluster member utilizes the same centralized billing database, each cluster member has access to records in the billing database, including such as additional client state details, and infrastructure device details, which also reflect the state of the entire LAN.

The master server is responsible for detecting failed and recovered members of the cluster. As shown in FIG. 5, the master server detects the presence or absence of status updates from the other members of the cluster 100 (S20). The master server reassigns a failed member's tasks to other cluster members, including the master member itself, by sending configuration adjustment messages to other cluster members (S22), or by adjusting its own configuration (S24). The master member can also return a failed member's responsibilities to that member upon its recovery.

Each member of a cluster is configured with an ordinal member ranking, from 0 to N−1 inclusive. Cluster member 0 is the default master of the cluster. More generally, the lowest ranking live member of the cluster will be that cluster's master. For example, as shown in FIG. 6, if the current master member, Server 0, becomes unresponsive (S30), and Server 1 is unresponsive, then the lowest ranking live member, Server 2, assumes mastery (S32). If an unresponsive member is revived, and if that member possesses a rank lower than that of the cluster's current member, then that revived member assumes mastery of the cluster.

Configuration details of the VBN server clustering system 1 are described hereinafter.

In this embodiment, the member VBN servers 10 within the cluster 100 split or partition the LAN's traffic processing among themselves by performing media access control (MAC) address filtering. Each cluster member server 10 drops packets sent from all but a specific contiguous collection, or collections, of end-user device MAC addresses, very soon after those packets enter the server 10, and, most importantly, before any significant processing of those packets occurs, for example, at the interface. This filtering is subject to certain exceptions, as described below. Such significant processing may include that which creates or updates an entry or entries within the device data store, and/or which provides a response to the device, and/or which may cause the server to provide a response to the device in the future, and/or which may cause the server to send any traffic to the device immediately or in the future.

Specifically, an acceptance filter is applied to the least significant byte of the source MAC address of a packet. Network hardware manufacturers are allocated MAC address prefixes which reside in the first few most significant bytes of a MAC address; the least-significant bytes of a MAC address are thus not influenced by hardware brand, and therefore any filtering applied to the least significant byte of a MAC address typically spreads the LAN's traffic almost evenly among the member servers 10 of the cluster 100. Collectively, all live member servers 10 of the cluster 100 accept the entire possible range of end-user device MAC addresses so that the filtering can allow any MAC address to appear on the LAN at any time. The end-user device MAC filtering ensures that at any given moment, each end-user device connected on the LAN 'sees', and is serviced by, only a single cluster member server 10.

The cluster member VBN servers share a mostly common server configuration, and a common client device data store state which is common through intermittent updates and merging. When a central database or a billing database is used, the cluster member VBN servers also share the records stored in the central database and/or in the billing database as described earlier. The client device data store and server configuration sharing facilitates the MAC filtering and also the failover behaviour of the cluster. Each cluster member is configured with the same assignable IP address ranges, so that each cluster member can maintain the same list of client device data store entries, as shown in examples below. An assignable IP address range is a range from which a VBN server can assign an IP address to a client device.

Each assignable IP address range is associated with a MAC address range. An assignable IP address range is Active on a cluster member only if that cluster member is currently accepting traffic from that MAC address range. Thus, each cluster member considers only a subset of the assignable IP address ranges, and thus, only a subset of the client device data store entries, to be locally active, according to those entries' MAC addresses and the member's current MAC address filtering settings, as shown in examples below.

Basic networking rules state that no two entities within a LAN can possess the same IP address. Consequently, when an existing VBN server is used, the assignable IP address range configuration scheme of the VBN server is adjusted as follows. If a VBN server is operating in Clustering mode, and has been configured to operate within a cluster of N members, then the New Subnet configtool page generates N sub-subnets of practically equal size for each end-user subnet that it is instructed to create. Each sub-subnet is automatically assigned its own MAC address range, ensuring that it is active on only one cluster member at a time. This ensures that each end-user IP address is active on only one cluster member at a time, and also ensures that at any given moment, each end-user IP address can be assigned by only one cluster member. Configuration changes such as subnet creation are propagated throughout the cluster by cluster coordination software. Each VBN server within the cluster is configured with all assignable IP address ranges which the cluster as a whole manages. However, only a subset of those ranges is active on any given member of the cluster, unless all other members of the cluster have become inoperative. Accordingly, only the relevant subset of the corresponding IP subnets are instantiated on any given cluster member's LAN-side network interface. When clustering responsibilities are reassigned due to a member's failure or recovery, a cluster member may activate or deactivate one or more of its configured assignable IP address ranges and, by extension, activate or deactivate one or more of the client device records present within the client device data store, and also instantiate or uninstantiate the corresponding IP subnets on its LAN-side interface, as shown in examples below.

The infrastructure device support is now described hereinafter.

Non-end-user subnets, i.e., subnets for use by network infrastructure devices 32, are managed differently than end-user subnets. Each cluster member 10 may need to communicate with any of all the LAN's infrastructure devices 32, regardless of that cluster member's MAC filtering settings. In order to facilitate this, the cluster members 10 do not subject network infrastructure devices to the MAC address filtering. Instead, the cluster members 10 are configured such that even if the MAC filtering settings of a VBN server 10 disallows the packet, the packet is accepted if the source MAC address of the packet is that of a known LAN infrastructure device 32 that is preconfigured on the VBN server 10.

Thus, each cluster member 10 utilizes the same active non-end-user subnet(s), concurrently. To facilitate this, the clustering manager 70 reserves at least an extra N (N=number of cluster members) IP addresses at the beginning of each non-end-user subnet, so that the assignable portion of each such subnet is smaller than it would normally be. Each cluster member 10 instantiates one of those reserved IP addresses onto its LAN-side interface 66. One cluster member 10 instantiates at least a second of those reserved IP addresses onto its LAN-side interface 66, for use as a gateway IP address by infrastructure devices 32, as described below. This way, each cluster member 10 can concurrently maintain an active client device data store entry for each infrastructure device 32, and thus communicate with those infrastructure devices 32, without presenting the LAN with replicate VBN server IP addresses.

Some network infrastructure devices are configured statically. That is, a network administrator assigns an infrastructure device's IP address and gateway IP address manually, and that those settings persist over time. Other network infrastructure devices can obtain their IP addresses dynamically, via the Dynamic Host Configuration Protocol (DHCP) protocol, from a VBN server or from a third-party DHCP server residing on the LAN.

VBN servers typically support the statically-configured infrastructure devices by providing the IP subnets and gateway IP addresses to which those infrastructure devices already belong, instead of requiring alterations to the configurations of those infrastructure devices. Alternatively, when a VBN server is added to a network, the manual reconfiguration of the infrastructure devices is performed to suit the network settings of the VBN server. A VBN server can also provision infrastructure devices with network setting that suit the VBN server, via the DHCP protocol. These DHCP-provided settings typically include a gateway IP address which resides on the LAN-side interface of the VBN server.

One VBN cluster member 10 maintains at least two IP addresses from each of its non-end-user subnets on its LAN-side interface 66. One or more of these IP addresses is(are) the gateway IP address(es) of the infrastructure devices. Each member 10 of the VBN server cluster 100 is able to communicate with the infrastructure devices 32, but at any given time only one member 10 of the VBN cluster 100 acts as the infrastructure devices gateway(s). A typical network infrastructure device will be configured with only a single gateway IP address.

Should the VBN cluster member which is serving as the infrastructure devices' gateway(s) fail, then the remaining cluster members designates one of those remaining members to act as the infrastructure devices' gateway(s), by adding the relevant non-end-user subnet IP address(es) to its LAN-side interface, and then issuing a gratuitous Address Resolution Protocol (ARP) announcement and ideally also an unsolicited ARP announcement to the LAN to inform the LAN of the new location of those interface IP addresses.

The VBN server clustering operates at the second-layer of the Open Systems Interconnection (OSI) model, specifically the MAC layer, because this is more efficient in dropping unaccepted packets at the earliest possible point in the network reception path, and because of the unique behaviour of at least most VBN servers: proprietary packet analysis and manipulation occurs before the operating system's IP and TCP processing begins, and so packets need to be accepted or dropped as soon as they leave the network card, prior to significant processing occurs, for example, at the interface. The VBN servers each present unique LAN-side MAC and IP addresses to the LAN.

Alternative traffic filtering schemes are now described hereafter.

The first embodiment was described above using the source MAC address filtering scheme. However, other traffic filtering schemes may be implemented, instead of the MAC filtering scheme, with the same results, provided that a) the unwanted packets are dropped before any significant processing is applied to them, ideally as soon as possible after they leave the network card and enter the server's operating system, prior to significant processing occurs, for example, at the interface, and b) a given end-user device is processed by only a single particular member of the VBN server cluster, unless that member of the cluster becomes unresponsive, in which case that end-user device starts being processed by another single particular member of the VBN server cluster.

One alternative packet filtering scheme is source IP address filtering. In this scheme, a packet is accepted by a VBN server only if the source IP address of the packet is acceptable by the VBN server, or if that source IP address is that of a known infrastructure device. The assignable address ranges of the VBN server is associated with ranges of IP addresses, instead of with MAC address ranges.

In this scheme, a DHCP server is used so that the end-user devices on the LAN have assigned IP addresses and gateway IP addresses assigned by the DHCP server in such a manner that a roughly equal number of user devices is accepted by each member of the VBN server cluster.

The DHCP server in this scheme typically resides external to all of the VBN servers. However, one of the VBN servers may act as the LAN's DHCP server.

Another alternative packet filtering scheme is virtual LAN (VLAN) filtering. The LAN may be partitioned into multiple Virtual LANs, by the reconfiguration of the LAN's infrastructure. Such LAN reconfiguration is, as was explained earlier, often undesirable, but it is occasionally feasible.

Most types of VLANs, such as the IEEE 802.1q VLANs, are implemented by altering the structure and content of network packet headers. Filtering of VLANned packets is therefore possible by examining packet headers, as MAC-based and IP-based filtering are possible.

In this scheme, each VBN server within the cluster accepts traffic from only a certain collection of VLANs, and denies all other traffic, prior to significant processing occurs, for example, at the interface, but with the exception of infrastructure devices.

Also, it is possible to use a filtering scheme that uses a hashing by MAC address. In this scheme, a mathematical function is used to determine by which VBN server a given MAC address should be serviced, e.g., f(MAC ADDRESS)=VBN SERVER ID. Each assignable address range is then associated with a value produced by the hashing function.

It is also possible to use a filtering scheme that uses hashing by IP address, instead of by MAC address.

Other alternative packet filtering schemes would be possible, if unlikely. If a LAN could be reconfigured to encode other types of partitioning data into network packets, such that at any given moment a given user would be associated with only a single interpreted value of that data, then a VBN server could be configured to accept or reject packets based upon that data, and perform the clustering behaviours described earlier in this document.

Examples of the configuration of the VBN server cluster 100 are described using the following three cluster members: A, B, C:

Cluster Member A

Allowing MAC Range: [0,60]
Assignable IP Address Ranges:
Subnet: [10.10.10.2 10.10.10.126]   Interface IP: 10.10.10.1/25
        Type: user    MAC Range: [0,60]    Status: Active
Subnet: [10.10.10.130       10.10.10.190]     Interface IP: 10.10.10.129/26
        Type: user    MAC Range: [61,c0]   Status: Inactive
Subnet: [10.10.10.194       10.10.10.254]     Interface IP: 10.10.10.193/26
        Type: user    MAC Range: [c1,ff]   Status: Inactive
Subnet: [10.0.44.5          10.0.44.254]    Interface IPs: 10.0.44.1/24, 10.0.44.2/24   Type: infrastructure    MAC Range: [0, ff]
        Status: Active
Instantiated LAN-Interface IP addresses:   10.10.10.1/25, 10.0.44.1/24, 10.0.44.2/24
Client Device Data Store Records:
MAC:    00:30:1e:80:16:f8   Assigned IP: 10.0.44.44
        Type: Infrastructure       Active: Yes
MAC:    00:77:f3:dd:c2:05   Assigned IP: 10.10.10.2
        Type: end-user Active: Yes
MAC:    00:16:d4:c7:6b:65   Assigned IP: 10.10.10.130
        Type: end-user Active: No
MAC:    00:54:bb:3c:d1:c5   Assigned IP: 10.10.10.194
        Type: end-user Active: No

Cluster Member B

Allowing MAC Range: [61,c0]
Assignable IP Address Ranges:
Subnet: [10.10.10.2 10.10.10.126]   Interface IP: 10.10.10.1/25
        Type: user    MAC Range: [0,60]    Status: Inactive
Subnet: [10.10.10.130       10.10.10.190]     Interface IP: 10.10.10.129/26
        Type: user    MAC Range: [61,c0]   Status: Active
Subnet: [10.10.10.194       10.10.10.254]     Interface IP: 10.10.10.193/26
        Type: user    MAC Range: [c1,ff]   Status: Inactive
Subnet: [10.0.44.5          10.0.44.254]    Interface IP: 10.0.44.3/24
        Type: infrastructure       MAC Range: [0, ff]
        Status: Active
Instantiated LAN-interface IP addresses: 10.10.10.129/26, 10.0.44.3/24
Client Device Data Store Records:
MAC:    00:30:1e:80:16:f8   Assigned IP: 10.0.44.44
        Type: Infrastructure       Active: Yes
MAC:    00:77:f3:dd:c2:05   Assigned IP: 10.10.10.2
        Type: end-user Active: No
MAC:    00:16:d4:c7:6b:65   Assigned IP: 10.10.10.130
        Type: end-user Active: Yes
MAC:    00:54:bb:3c:d1:c5   Assigned IP: 10.10.10.194
        Type: end-user Active: No

Cluster Member C

Allowing MAC Range: [c1,ff]
Assignable IP Address Ranges:
Subnet: [10.10.10.2 10.10.10.126]   Interface IP: 10.10.10.1/25
        Type: user    MAC Range: [0,60]    Status: Inactive
Subnet: [10.10.10.130       10.10.10.190]     Interface IP: 10.10.10.129/26
        Type: user    MAC Range: [61,c0]   Status: Inactive
Subnet: [10.10.10.194       10.10.10.254]     Interface IP: 10.10.10.193/26
        Type: user    MAC Range: [c1,ff]   Status: Active
Subnet: [10.0.44.5   10.0.44.254]    Interface IP:10.0.44.4/24
        Type: infrastructure       MAC Range: [0, ff]
        Status: Active
Instantiated LAN-interface IP addresses: 10.10.10.193/26, 10.0.44.4/24
Client Device Data Store Records:
MAC: 00:30:1e:80:16:f8     Assigned IP: 10.0.44.44   Type: Infrastructure Active: Yes
MAC: 00:77:f3:dd:c2:05     Assigned IP: 10.10.10.2         Type: end-user Active: No

| Cluster Member C | | |
|---|---|---|
| MAC: 00:16:d4:c7:6b:65 end-user Active: No | Assigned IP: 10.10.10.130 | Type: |
| MAC: 00:54:bb:3c:d1:c5 end-user Active: Yes | Assigned IP: 10.10.10.194 | Type: |

This cluster contains three members A, B, C, all live. Member A is accepting end-user LAN packets which originate from MAC addresses which possess a least-significant byte (LSB) (rightmost printed sextet) between 0 and 60. Member B is accepting end-user device MAC addresses within the range [61, c0]. Member C is accepting the remaining possible end-user device MAC addresses, which fall within the range [c1,ff].

Thus, sub-subnet 10.10.10.1/25 which possesses a MAC range of [0,60] is active on member A, sub-subnet 10.10.10.129/26 which possesses a MAC range of [61,c0] is active on member B, sub-subnet 10.10.10.194/26 with a MAC range of [c1,ff] is active on member C. For example, that end-user 00:16:d4:c7:6b:65 is active on member B, because the MAC address of this end-user falls within the accepted MAC address range of member B.

The single Infrastructure subnet 10.0.44.x is present and active on all three cluster members. Note, however, that the Interface IP address of this range differs on each member, i.e., 10.0.44.1 and 10.0.44.2 for member A, 10.0.44.3 for member B, and 10.0.44.4 for member C. This enables each member to utilize the same Infrastructure IP addresses without presenting replicated LAN-side interface IP addresses to the LAN. It also enables 10.0.44.1 to be used as the gateway IP address for infrastructure devices, and thus, 10.0.44.1 is automatically transferred to cluster member B or C if cluster member A fails, as described earlier in the description of infrastructure device support. Network infrastructure devices are not subjected to MAC address filtering, and thus, each cluster member may communicate with each device.

The next example uses the same cluster, but with member C unresponsive.

| Cluster Member A | | |
|---|---|---|
| Allowing MAC Range: [0,60] | | |
| Assignable IP Address Ranges: | | |
| Subnet: [10.10.10.2  10.10.10.126] | Interface IP: 10.10.10.1/25 | |
| Type: user    MAC Range: [0,60] | Status: Active | |
| Subnet: [10.10.10.130       10.10.10.190] | Interface IP: 10.10.10.129/26 | |
| Type: user    MAC Range: [61,c0] | Status: Inactive | |
| Subnet: [10.10.10.194       10.10.10.254] | Interface IP: 10.10.10.193/26 | |
| Type: user    MAC Range: [c1,ff] | Status: Inactive | |
| Subnet: [10.0.44.5          10.0.44.254] | Interface IPs: 10.0.44.1/24, 10.0.44.2/24      Type: infrastructure    MAC Range: [0, ff]    Status: Active | |
| Instantiated LAN-interface IP addresses:      10.10.10.1/25, 10.0.44.1/24, 10.0.44.2/24 | | |
| Client Device Data Store Records: | | |
| MAC:    00:30:1e:80:16:f8  Assigned IP: 10.0.44.44           Type: Infrastructure             Active: Yes | | |
| MAC:    00:77:f3:dd:c2:05  Assigned IP: 10.10.10.2           Type: end-user Active: Yes | | |
| MAC:    00:16:d4:c7:6b:65  Assigned IP: 10.10.10.130           Type: end-user Active: No | | |
| MAC:    00:54:bb:3c:d1:c5  Assigned IP: 10.10.10.194           Type: end-user Active: No | | |

| Cluster Member B |
|---|
| Allowing MAC Range: [61,ff] |
| Assignable IP Address Ranges: |
| Subnet: [10.10.10.2  10.10.10.126]    Interface IP: 10.10.10.1/25        Type: user    MAC Range: [0,60]    Status: Inactive |
| Subnet: [10.10.10.130       10.10.10.190]    Interface IP: 10.10.10.129/26        Type: user    MAC Range: [61,c0]    Status: Active |
| Subnet: [10.10.10.194       10.10.10.254]    Interface IP: 10.10.10.193/26        Type: user    MAC Range: [c1,ff]    Status: Active |
| Subnet: [10.0.44.5          10.0.44.254]    Interface IP: 10.0.44.3/24        Type: infrastructure       MAC Range: [0, ff]        Status: Active |
| Instantiated LAN interface IP addresses: 10.10.10.129/26, 10.10.10.193/26, 10.0.44.3/24 |
| Client Device Data Store Records: |
| MAC:    00:30:1e:80:16:f8  Assigned IP: 10.0.44.44           Type: Infrastructure             Active: Yes |
| MAC:    00:77:f3:dd:c2:05  Assigned IP: 10.10.10.2           Type: end-user Active: No |

-continued

Cluster Member B

MAC: 00:16:d4:c7:6b:65 Assigned IP: 10.10.10.130
Type: end-user Active: Yes
MAC: 00:54:bb:3c:d1:c5 Assigned IP: 10.10.10.194
Type: end-user Active: Yes This cluster contains the same three members, but the third member C is offline, and so the cluster has adjusted its configuration accordingly. Cluster member A is still accepting LAN packets which originate from MAC addresses which possess a LSB (rightmost printed sextet) between 0 and 60. Member B has been assigned the responsibilities of member C, and thus, member B now accepts the remainder of the possible MAC addresses, which fit into the range [61,ff] which is the original MAC filtering range of member C concatenated with the MAC filtering range of member C.

A VBN cluster member can also filter by multiple MAC address ranges, in a case here if the MAC address range of member C did not start where the original MAC address range of member B left off.

Thus, sub-subnet 10.10.10.1/25 which possesses a MAC range of [0,60] is active on member A, and sub-subnets 10.10.10.129/26 and 10.10.10.193/26 are active on member B. For example, end-user entries 00:16:d4:c7:6b:65 and 00:54:bb:3c:d1:c5 are active on cluster member B. The responsibilities for assignable IP address range [10.10.10.194 10.10.10.254] and client 00:54:bb:3c:d1:c5 have been transferred from member C to member B.

The above examples are described using private IP addresses, i.e., masqueraded or NATted IP addresses. In a different embodiment, the VBN server clustering system 1 may also support public IP addresses, i.e., not-masqueraded or NATted IP addresses. In such an embodiment, the VBN server clustering system 1 can assign private or public IP addresses to user devices, as requested by users and/or as configured on the server.

Private IP addresses are translated (NATted or masqueraded) at the WAN interface 68 of the server 10, to one of the IP addresses which that WAN interface itself possesses. Public IP addresses are not subjected to this translation.

A public IP address must be routed to a server by the network on which the server presents its WAN interface, so that traffic destined to that public IP address is sent to that one of that WAN interface's own IP addresses. The relevant WAN interface IP address must belong to the same subnet as the range of public assignable IP addresses.

This routing requirement is recognized and supported by the VBN server clustering system, in the embodiment where a cluster of VBN servers is to assign public IP addresses to user devices or infrastructure devices. If a VBN server in a cluster is configured with a public assignable IP address range, and that VBN server fails, then that public IP address range is activated on a different VBN server, as described above.

In this case of a range of public assignable IP addresses, however, the following additional steps are taken in the clustering system by the clustering software or by the manual administrator):

the corresponding WAN interface IP address is activated on the recipient server; and
a gratuitous ARP announcement is sent, and an unsolicited ARP announcement is sent, from the WAN interface in order to inform the WAN-side network of the new location of the relevant WAN-side IP address.

For example, given the range of public assignable IP addresses 5.5.5.2-5.5.5.24 which belong to the 5.5.5.0/24 subnet, and a corresponding WAN interface IP address of 5.5.5.1, when this assignable IP address range is activated on a different member of the cluster, the WAN interface of that server also activates the 5.5.5.1 IP address, and sends the ARP announcements advertising the relocation of 5.5.5.1.

By extension, if this range is deactivated on a cluster member, then 5.5.5.1 is deactivated on its WAN interface.

The software processes of the VBN server are now described hereafter.

There are two software processes which coordinate clustering: soln-clusterd, and soln-clusterconfigd, which are provided in addition to an existing VBN server. Both of these processes run on each member of a cluster.

soln-clusterd is the clustering brain. It implements status updates between child members and the master member, initiates and coordinates failovers and recoveries, determines and enforces mastery, merges client device data store states when running on the master member, and applies merged client device data store states by instantiating them locally on the master and by sending them to the child members for instantiation.

soln-clusterd runs in one of two operational modes: master and child. On the current master cluster member, soln-clusterd operates in master mode, and thus serves to receive and process status updates from the other cluster members, and to transmit merged status data to the the children. The master mode soln-clusterd also detects and manages cluster member failure and recovery. The child mode soln-clusterd sends status updates to the master cluster member, and receives status updates and configuration adjustment instructions from the master. If a child is promoted to master, by the failure of the present master (failure detected by the child by the lack of received merged status transmissions, or by the failure of the child's transmitted status messages), then that child's soln-clusterd process switches from child mode to master mode. If, when operating in master mode, a VBN server's soln-clusterd process detects an active VBN server which possesses a lower cluster member ID than its own, then that master server relinquishes mastery in favour of the other server.

soln-clusterconfigd is a service utilized by the Configuration Tool in the VBN server. It is used to share much of a cluster member's configuration, as recorded by the Configuration Tool within a local text file, with the rest of the cluster. This functionality allows, for example, subnets to be defined on any member of the cluster, and then pushed to the other members of that cluster. soln-clusterconfigd performs the manipulation of non-end-user subnets, so that each cluster member instantiates the unique non-end-user subnet IP addresses on the LAN side interfaces of the cluster members. The act of pushing a server's configuration, via soln-clusterconfigd, is a deliberate operation, which is triggered from the configtool.

soln-clusterconfigd allows the portion of the configuration of a VBN server which is not stored within the VBN server's database to be shared among the members of a cluster. Since those cluster members share a central database, the members of a cluster will share the entirety of a common server configuration.

Second Embodiment

Figure 7:
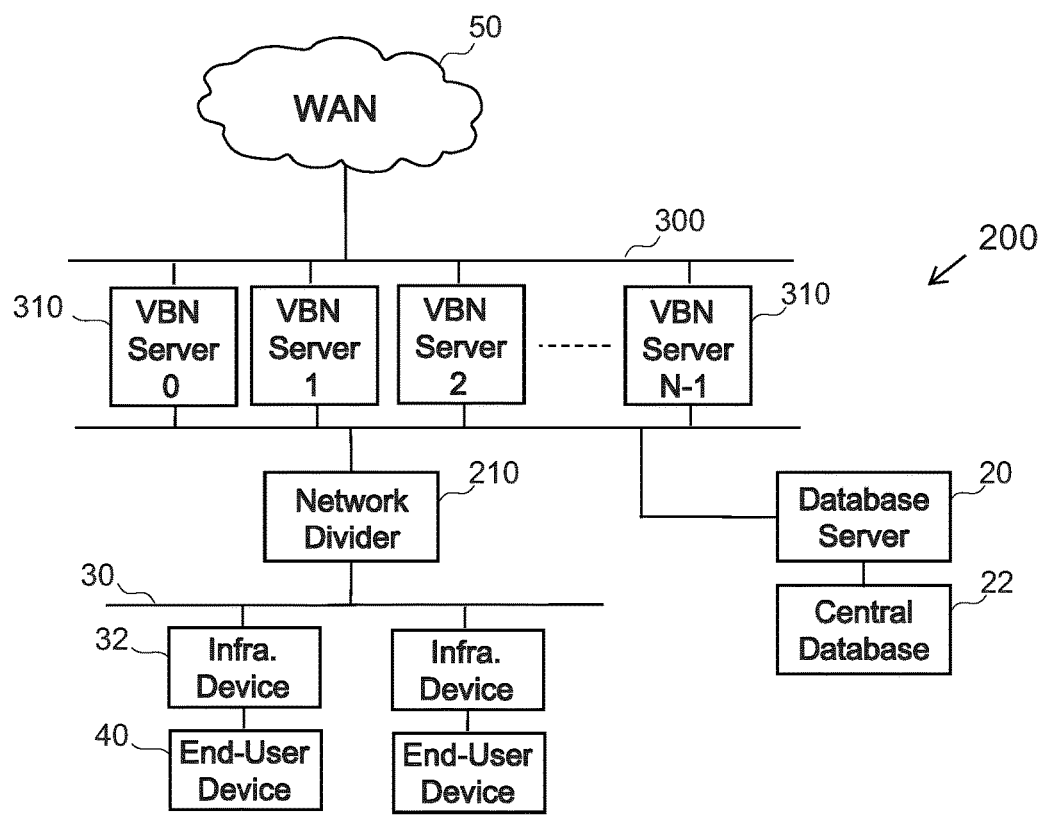
FIG. 7 is a diagram showing a VBN server clustering system in accordance with the second embodiment of the present invention.

Referring to FIG. 7, a multiple-server system 200 according to the second embodiment of the present invention is described. In FIG. 7, elements that are similar to those shown in FIG. 1 are labelled with the same numbers.

In the first embodiment, each VBN server 10 performs traffic filtering to form the cluster 100 by themselves. In the second embodiment, instead of having each VBN server to perform traffic filtering, the multiple-server system 200 uses an extra and special network divider 210 to divide the work of servicing the LAN 30 among a cluster 300 of VBN servers 310 without modification to the LAN 30. The network divider 210 may be a network switch, server or appliance.

The network divider 210 is a software/hardware unit to perform the special packet filtering, and packet filtering adjustments, and perform the requisite communication with the actual cluster members. Optionally, the network divider may require manual configuration in order to accommodate an arrangement of VBN servers.

The network divider 210 is connected to communication links each connected to a different one of the VBN server 310 in the cluster 300. In an embodiment, the network divider 210 performs link aggregation and assigns certain packets to particular communication links, based solely upon packet source MAC address. The link aggregation method used by the network divider 210 does not require the use of a standardized control protocol such as LACP. Since the network divider 210 assigns a packet to particular VBN server 310 via a particular communication link based upon packet source MAC address, it can partition the overall network traffic across the VBN servers 310 in a similar manner to the MAC-based traffic filtering of the VBN server clustering system 1 of the first embodiment, except that the traffic partitioning occurs on the external network divider 210 before the packets reach the VBN servers 310 in the second embodiment. As in the first embodiment, each VBN server 310 receives traffic from only a well-defined subset of end-user devices connected to the LAN, based upon the MAC addresses of those end-user devices. In a different embodiment, the network dividing may be performed based on IP address or other attribute present within each packet, as described above for the filtering.

The network divider 210 may regularly communicate with the VBN servers, via a software/hardware mechanism, in order to determine failure of one or more of the VBN servers 310. Also, the network divider 210 may obtain information from the VBN servers 310 so that it can determine to which VBN server(s) to assign the traffic to the failed VBN server(s). Alternatively, the network divider may require manual configuration in order to accommodate an arrangement of VBN servers.

The elements of the VBN server clustering system and VBN servers of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the VBN server clustering system and VBN servers are described separately, however, two or more elements may be provided as a single element, or one or more elements may be shared with other components in one or more computer systems.

What is claimed is:

1. A visitor based network (VBN) server clustering system comprising:
   a cluster of VBN servers for processing network traffic from and to one or more user devices connected to a single local area network (LAN),
   wherein each of the VBN servers comprises:
      a client device data store that is configured to create and maintain device state records of the one or more user devices connected to the LAN for use by the respective VBN server in processing network traffic;
      an interface that is configured to perform data communication with the one or more user devices through the LAN; and
      a clustering manager that is configured to implement clustering of the VBN servers by filtering the network traffic from and to the one or more user devices based on filtering criteria specified in configuration settings for the VBN server so as to allow the network traffic processing unit to process only a filtered portion of the network traffic,
      wherein the filtering of the network traffic by the clustering manager of each of the VBN servers partitions the network traffic so that network traffic of each user device is processed by a specific one of the VBN servers within the cluster at a given time.

2. The VBN server clustering system as claimed in claim 1, wherein each of the VBN servers further comprises:
   a cluster configuration manager that is configured to manage and share configuration settings of the VBN server with the other VBN servers within the cluster.

3. The VBN server clustering system as claimed in claim 2 further comprising:
   a database server that is configured to manage a central database that stores data including the shared configuration settings of the VBN servers within the cluster.

4. The VBN server clustering system as claimed in claim 1 further comprising:
   multiple databases or data stores, each provided within each of the VBN servers to store data including at least data relating to configuration settings of the VBN server; and
   a synchronizer that is configured to perform updates and synchronization among the databases or the data stores so that records of the databases or the data stores are replicated.

5. The VBN server clustering system as claimed in claim 1, wherein the clustering manager comprises a traffic filter that filters the network traffic using user device media access control (MAC) addresses included in packets in the network traffic.

6. The VBN server clustering system as claimed in claim 5, wherein each VBN server in the cluster is configured with one or more MAC address filtering ranges so that the VBN server accepts packets in the network traffic having MAC addresses from the corresponding one or more MAC address filtering ranges.

7. The VBN server clustering system as claimed in claim 6, wherein
each VBN server within the cluster is configured with same one or more assignable IP address ranges, the one or more assignable IP address ranges of each VBN server being associated with the one or more MAC address filtering ranges acceptable by the VBN server,
wherein each assignable IP address range is active on a particular VBN server when the particular VBN server is currently accepting packets in the network traffic having MAC addresses from the corresponding one or more MAC address filtering ranges.

8. The VBN server clustering system as claimed in claim 1, wherein the clustering manager comprises a traffic filter that filters the network traffic using source internet protocol (IP) addresses included in packets in the network traffic so that the packets are accepted if the source IP address of the packet is acceptable by the VBN server or if the source IP address is that of an infrastructure device known to the VBN server,
wherein each VBN server has one or more assignable address ranges that are associated with ranges of IP addresses.

9. The VBN server clustering system as claimed in claim 1, wherein the clustering manager comprises a traffic filter that filters the network traffic using virtual LANs (VLANs) so that each VBN server within the cluster accepts traffic from only a certain collection of VLANs.

10. The VBN server clustering system as claimed in claim 1, wherein the clustering manager comprises a traffic filter that filters the network traffic using a hashing by MAC address by using a hashing function to determine by which VBN server a given MAC address is to be serviced, wherein the VBN server has one or more assignable address ranges, each associated with a value produced by the hashing function.

11. The VBN server clustering system as claimed in claim 1, wherein the clustering manager comprises a traffic filter that filters the network traffic using a hashing by IP address by using a hashing function to determine by which VBN server a given IP address is to be serviced, wherein the VBN server has one or more assignable address ranges, each associated with a value produced by the hashing function.

12. The VBN server clustering system as claimed in claim 1, wherein the clustering manager further comprises a status update handler that is configured to update the device state records in the client device data store based on shared device state records.

13. The VBN server clustering system as claimed in claim 1, wherein the clustering manager further comprises a master/child handler that is configured to control the VBN server to act as a master server or a child server.

14. The VBN server clustering system as claimed in claim 13, wherein when the VBN server acts as a child server, the master/child handler sends the device state records in the client device data store to the master server.

15. The VBN server clustering system as claimed in claim 14, wherein when the VBN server acts as a master server, the master/child handler merges the device state records received from the other VBN servers within the cluster acting as child servers, and distributes the merged device state records to the other VBN servers.

16. The VBN server clustering system as claimed in claim 1, wherein the clustering manager further comprises a failover handler that is configured to detect failure of one of the VBN servers within the cluster, reassigns tasks of the failed VBN server to the other VBN servers within the cluster by adjustment of configuration settings of the other VBN servers.

17. The VBN server clustering system as claimed in claim 16, wherein when the failover handler returns the reassigned tasks to the failed VBN server upon recovery of the failed VBN server.

18. The VBN server clustering system as claimed in claim 16, wherein when the VBN server acts as a master server, the master/child handler propagates configuration changes if a VBN server has failed or recovered.

19. The VBN server clustering system as claimed in claim 1, further configured to process network traffic from and to one or more infrastructure devices, wherein
the client device data store is configured to further create and maintain device state records the of one or more network infrastructure devices for use by the respective VBN server in processing network traffic,
the interface is configured to further perform data communication with the one or more infrastructure devices; and
the clustering manager is configured to allow the network traffic from the one or more network infrastructure devices to be processed by the network traffic processing unit without applying the filtering.

20. A visitor based network (VBN) server which is used as a member of a cluster of VBN servers for processing network traffic from and to one or more user devices connected to a single local area network (LAN), the VBN server comprising:
a client device data store that is configured to create and maintain device state records of the one or more user devices connected to the LAN for use by the VBN server in processing network traffic;
an interface that is configured to perform data communication with the one or more user devices through the LAN; and
a clustering manager that is configured to implement clustering of the VBN servers by filtering the network traffic from and to the one or more user devices based on filtering criteria specified in configuration settings for the VBN server so as to allow the network traffic processing unit to process only a filtered portion of the network traffic;
wherein the filtering of the network traffic by the clustering manager partitions the network traffic so that network traffic of each user device is processed by a specific one of the VBN servers within the cluster at a given time.

21. The VBN server as claimed in claim 20 further comprising:
a cluster configuration manager that is configured to manage and share configuration settings of the VBN server with the other VBN servers within the cluster.

22. The VBN server as claimed in claim 20 further comprising:
a database or data store to store data including configuration settings of the VBN server; and
a synchronization handler for communicating with a synchronizer that is configured to perform updates and synchronization among databases or the data stores in the VBN servers within the cluster so that records of the databases or the data stores are replicated.

23. The VBN server as claimed in claim 20, wherein the clustering manager comprises a traffic filter that filters the network traffic using user device media access control (MAC) addresses included in packets in the network traffic.

24. The VBN server as claimed in claim 23, wherein the VBN server in the cluster is configured with one or more MAC address filtering ranges so that the VBN server accepts packets in the network traffic having MAC addresses from the corresponding one or more MAC filtering address ranges.

25. The VBN server as claimed in claim 24, wherein the VBN server is configured with same one or more assignable IP address ranges as other VBN servers within the cluster, the assignable IP address ranges of the VBN server being associated with the one or more MAC address filtering ranges acceptable by the VBN server,
  wherein each assignable IP address range is active on the VBN server when the VBN server is currently accepting packets in the network traffic having MAC addresses from the corresponding one or more MAC address filtering ranges.

26. The VBN server as claimed in claim 20, wherein the clustering manager comprises a traffic filter that filters the network traffic using source internet protocol (IP) addresses included in packets in the network traffic so that the packets are accepted if the source IP address of the packet is acceptable by the VBN server or if the source IP address is that of an infrastructure device known to the VBN server,
  wherein the VBN server has one or more assignable address ranges that are associated with ranges of IP addresses.

27. The VBN server as claimed in claim 20, wherein the clustering manager comprises a traffic filter that filters the network traffic using virtual LANs (VLANs) so that the VBN server within the cluster accepts traffic from only a certain collection of VLANs.

28. The VBN server as claimed in claim 20, wherein the clustering manager comprises a traffic filter that filters the network traffic using a hashing by MAC address by using a hashing function to determine by which VBN server a given MAC address is to be serviced, wherein the VBN server has one or more assignable address ranges, each associated with a value produced by the hashing function.

29. The VBN server as claimed in claim 20, wherein the clustering manager comprises a traffic filter that filters the network traffic using a hashing by IP address by using a hashing function to determine by which VBN server a given IP address is to be serviced, wherein the VBN server has one or more assignable address ranges, each associated with a value produced by the hashing function.

30. The VBN server as claimed in claim 20, wherein the clustering manager further comprises a status update handler that is configured to update the device state records in the client device data store based on shared device state records.

31. The VBN server as claimed in claim 20, wherein the clustering manager further comprises a master/child handler that is configured to control the VBN server to act as a master server or a child server,
  wherein when the VBN server acts as a child server, the master/child handler sends the device state records in the client device data store to the master server, and
  when the VBN server acts as a master server, the master/child handler merges the device state records received from the other VBN servers within the cluster acting as child servers, and distributes the merged device state records to the other VBN servers.

32. The VBN server as claimed in claim 20, wherein the clustering manager further comprises a failover handler that is configured to detect failure of one of the VBN servers within the cluster, reassigns tasks of the failed VBN server to the other VBN servers within the cluster by adjustment of configuration settings of the other VBN servers.

33. The VBN server as claimed in claim 32, wherein when the failover handler returns the reassigned tasks to the failed VBN server upon recovery of the failed VBN server.

34. The VBN server as claimed in claim 20, further configured to process network traffic from and to one or more infrastructure devices, wherein
  the client device data store is configured to further create and maintain device state records of the one or more network infrastructure devices for use by the VBN server in processing network traffic,
  the interface is configured to further perform data communication with the one or more infrastructure devices; and
  the clustering manager is configured to allow the network traffic from the one or more network infrastructure devices to be processed by the network traffic processing unit without applying the filtering.

35. A method of clustering multiple visitor based network (VBN) servers to cooperate to service a single local area network (LAN), the method comprising:
  in each VBN server, creating and maintaining device state records of one or more user devices connected to the LAN in a client device data store;
  in each VBN server, filtering network traffic from and to the one or more user devices based on filtering criteria specified in configuration settings for the VBN server; and
  in each VBN server, processing only a filtered portion of the network traffic using the device state records in the client device data store,
  wherein the filtering of the network traffic partitions the network traffic so that network traffic of each user device is processed by a specific one of the VBN servers within the cluster at a given time.

36. The method as claimed in claim 35, further comprising:
  sharing configuration settings of the VBN server with the other VBN servers within the cluster.

37. The method as claimed in claim 36 further comprising:
  storing in a central database data including the shared configuration settings of the VBN servers within the cluster.

38. The method as claimed in claim 35 further comprising:
  providing a database or data store within each of the VBN servers to store data including configuration settings of the VBN server; and
  performing updates and synchronization among the databases or data stores so that records of the databases or data stores are replicated.

39. The method as claimed claim 35, wherein the filtering is carried out using user device media access control (MAC) addresses included in packets in the network traffic.

40. The method as claimed in claim 39 further comprising:
  configuring each VBN server in the cluster with one or more MAC address filtering ranges so that the VBN server accepts packets in the network traffic having MAC addresses from the corresponding one or more MAC address filtering ranges.

41. The method as claimed in claim 40, further comprising:
configuring each VBN server within the cluster with same one or more assignable IP address ranges, the assignable IP address ranges of each VBN server being associated with the one or more MAC address filtering ranges acceptable by the each VBN server, and
activating each assignable IP address range on a particular VBN server when the particular VBN server is currently accepting packets in the network traffic having MAC addresses from the one or more corresponding MAC address filtering ranges.

42. The method as claimed claim 35, wherein the filtering is carried out using source internet protocol (IP) addresses included in packets in the network traffic so that the packets are accepted if the source IP address of the packet is acceptable by the VBN server or if the source IP address is that of an infrastructure device known to the VBN server, wherein the VBN server has one or more assignable address ranges that are associated with ranges of IP addresses.

43. The method as claimed claim 35, wherein the filtering is carried out using virtual LANs (VLANs) so that the VBN server within the cluster accepts traffic from only a certain collection of VLANs.

44. The method as claimed claim 35, wherein the filtering is carried out using a hashing by MAC address by using a hashing function to determine by which VBN server a given MAC address is to be serviced, wherein the VBN server has one or more assignable address ranges, each associated with a value produced by the hashing function.

45. The method as claimed claim 35, wherein the filtering is carried out using a hashing by IP address by using a hashing function to determine by which VBN server a given IP address is to be serviced, wherein the VBN server has one or more assignable address ranges, each associated with a value produced by the hashing function.

46. The method as claimed claim 35 further comprising:
updating the device state records in the client device data store based on shared device state records.

47. The method as claimed claim 35 further comprising:
controlling the VBN server to act as a master server or a child server, so that when a VBN server acts as a child server, the VBN server is controlled to send the device state records in the client device data store to the master server, and
when a VBN server acts as a master server, the VBN server is controlled to merge the device state records received from the other VBN servers within the cluster acting as child servers, and distribute the merged device state records to the other VBN servers.

48. The method as claimed in claim 35 further comprising:
detecting failure of one of the VBN servers within the cluster; and
reassigning tasks of the failed VBN server to the other VBN servers within the cluster by adjustment of configuration settings of the other VBN servers.

49. The method as claimed in claim 48 further comprising:
returning the reassigned tasks to the failed VBN server upon recovery of the failed VBN server.

50. The method as claimed in claim 35, further comprising:
creating and maintaining device state records of one or more network infrastructure devices,
further performing data communication with the one or more infrastructure devices; and
processing network traffic from and to the one or more infrastructure devices using the device state records in the client device data store; and
the method further comprising allowing the network traffic from the one or more network infrastructure devices to be processed by the network traffic processing unit without applying the filtering.

51. A non-transitory computer readable memory storing computer readable code for execution in a computer, the code having instructions for implementing a method of clustering multiple visitor based network (VBN) servers to cooperate to service a single local area network (LAN), the instructions comprising the steps of:
in each VBN server, creating and maintaining device state records of one or more user devices connected to the LAN in a client device data store;
in each VBN server, filtering network traffic from and to the one or more user devices based on filtering criteria specified in configuration settings for the VBN server; and
in each VBN server, processing only a filtered portion of the network traffic using the device state records in the client device data store,
wherein the filtering of the network traffic partitions the network traffic so that network traffic of each user device is processed by a specific one of the VBN servers within the cluster at a given time.

52. A visitor based network (VBN) server clustering system comprising:
a cluster of VBN servers for processing network traffic from and to one or more user devices connected to a single local area network (LAN), each of the VBN servers comprising:
a client device data store that is configured to create and maintain device state records of the one or more user devices connected to the LAN for use by the respective VBN server in processing network traffic;
an interface that is configured to perform data communication with the one or more user devices through the LAN; and
a network divider that is configured to communicate with the VBN servers within the cluster, and implement clustering of the VBN servers by partitioning the network traffic from and to the one or more user devices to a particular one of the VBN servers based on partitioning criteria specified in configuration settings for the VBN servers so as to allow the network traffic processing unit to process only a partitioned portion of the network traffic, so that network traffic of each user device is processed by a specific one of the VBN servers within the cluster at a given time.

53. The VBN server clustering system as claimed in claim 52, wherein
each VBN server in the cluster has one or more media access control (MAC) address ranges so that the VBN server accepts packets in the network traffic having MAC addresses from the corresponding MAC address range, and
the network divider partitions the network traffic using user device MAC addresses included in packets in the network traffic.

54. The VBN server clustering system as claimed in claim 52, wherein the network divider divides the network traffic using source internet protocol (IP) addresses included in packets in the network traffic so that the packets are accepted if the source IP address of the packet is acceptable by the VBN server or if the source IP address is that of an infrastructure device known to the VBN server, wherein each VBN server has one or more assignable address ranges that are associated with ranges of IP addresses.

55. The VBN server clustering system as claimed in claim 52, wherein the network divider divides the network traffic using a hashing by MAC address by using a hashing function to determine by which VBN server a given MAC address is to be serviced, wherein the VBN server has one or more assignable address ranges, each associated with a value produced by the hashing function.

56. The VBN server clustering system as claimed in claim 52, wherein the network divider divides the network traffic using a hashing by IP address by using a hashing function to determine by which VBN server a given IP address is to be serviced, wherein the VBN server has one or more assignable address ranges, each associated with a value produced by the hashing function.

57. The VBN server clustering system as claimed in claim 52, wherein the network divider is one of a network switch, a server and an appliance.

58. A method of clustering multiple visitor based network (VBN) servers to cooperate to service a single local area network (LAN), the method comprising:

in each VBN server, creating and maintaining device state records of one or more user devices connected to the LAN in a client device data store;

in a network divider that communicates with each VBN server, partitioning network traffic from and to the one or more user devices based on partitioning criteria specified in configuration settings for each VBN server, so that network traffic of each user device is processed by a specific one of the VBN servers within the cluster at a given time; and in each VBN server, processing only a partitioned portion of the network traffic using the device state records in the client device data store.

59. The method as claimed in claim 58, wherein
the partitioning is carried out using user device media access control (MAC) addresses included in packets in the network traffic, wherein each VBN server in the cluster has one or more MAC address ranges so that the VBN server accepts packets in the network traffic having MAC addresses from the corresponding MAC address range.

60. The method as claimed in claim 58, wherein the portioning is carried out using source internet protocol (IP) addresses included in packets in the network traffic so that the packets are accepted if the source IP address of the packet is acceptable by the VBN server or if the source IP address is that of an infrastructure device known to the VBN server, wherein each VBN server has one or more assignable address ranges that are associated with ranges of IP addresses.

61. The method as claimed in claim 58, wherein the portioning is carried out using a hashing by MAC address by using a hashing function to determine by which VBN server a given MAC address is to be serviced, wherein the VBN server has one or more assignable address ranges, each associated with a value produced by the hashing function.

62. The method as claimed in claim 58, wherein the portioning is carried out using a hashing by IP address by using a hashing function to determine by which VBN server a given IP address is to be serviced, wherein the VBN server has one or more assignable address ranges, each associated with a value produced by the hashing function.

63. A non-transitory computer readable memory storing computer readable code for execution in a computer, the code having instructions for implementing a method of clustering multiple visitor based network (VBN) servers to cooperate to service a single local area network (LAN), the instructions comprising the steps of:

in each VBN server, creating and maintaining device state records of one or more user devices connected to the LAN in a client device data store;

in a network divider that communicates with each VBN server, partitioning network traffic from and to the one or more user devices based on partitioning criteria specified in configuration settings for each VBN server, so that network traffic of each user device is processed by a specific one of the VBN servers within the cluster at a given time; and in each VBN server, processing only a partitioned portion of the network traffic using the device state records in the client device data store.

\* \* \* \* \*